US012737193B2

(12) United States Patent
Zou et al.

(10) Patent No.: US 12,737,193 B2
(45) Date of Patent: Sep. 15, 2026

(54) APPARATUS, DEVICE, METHOD, AND COMPUTER PROGRAM FOR A COMPUTER SYSTEM

(71) Applicant: Intel Corporation, Santa Clara, CA (US)

(72) Inventors: Juan Zou, Shanghai (CN); Kezhao Liu, Shanghai (CN); Minjie Wang, Shanghai (CN); Yan Lu, Shanghai (CN); Qing De Xia, Shanghai (CN); Kathappan Esakkithevar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/842,826

(22) PCT Filed: Mar. 31, 2022

(86) PCT No.: PCT/CN2022/084306

§ 371 (c)(1),
(2) Date: Aug. 30, 2024

(87) PCT Pub. No.: WO2023/184309

PCT Pub. Date: Oct. 5, 2023

(65) Prior Publication Data

US 2025/0173157 A1 May 29, 2025

(51) Int. Cl.
*G06F 9/4401* (2018.01)

(52) U.S. Cl.
CPC .................................. *G06F 9/4411* (2013.01)

(58) Field of Classification Search
CPC ..................................................... G06F 9/4411
(Continued)

(56) References Cited

U.S. PATENT DOCUMENTS 6,870,818 B1 * 3/2005 Burdin .................... H04L 61/00 370/257
2008/0114570 A1 * 5/2008 Li ........................... H04L 67/51 702/182

(Continued)

FOREIGN PATENT DOCUMENTS

CN 107145343 A 9/2017
EP 3705999 A1 * 9/2020 .......... G06F 11/0727

OTHER PUBLICATIONS

Zhao, Na-Jing et al.: "Transplantation of Exynos4412 embedded Linux system based device tree platform", Journal of Engineering of Heilongjiang University, vol. 11, No. 4, Dec. 25, 2020.

*Primary Examiner* — Henry W Yu
(74) *Attorney, Agent, or Firm* — 2SPL Patent Attorneys PartG mbB; Yong Beom Hwang

(57) ABSTRACT

Examples relate to a computer system and to an apparatus device method, and computer program for a computer system. The apparatus comprises processing circuitry is configured to detect the presence of a peripheral device connected to the computer system. The processing circuitry is configured to add the peripheral device to a device tree managed by a firmware of the computer system, by adding a first and a second device node to the device tree, the first device node representing the peripheral device and the second device node representing a reset capability or firmware flash capability of the peripheral device.

20 Claims, 3 Drawing Sheets

(58) Field of Classification Search
USPC ................................ 710/2, 8, 10, 15–16, 62
See application file for complete search history.

(56) References Cited

U.S. PATENT DOCUMENTS

2008/0263061 A1* 10/2008 Nath .................. G06F 16/2246
2013/0198500 A1 8/2013 Bowling
2013/0238639 A1* 9/2013 Venkatasubramanian .................. G06F 16/81 707/755

* cited by examiner

APPARATUS, DEVICE, METHOD, AND COMPUTER PROGRAM FOR A COMPUTER SYSTEM

BACKGROUND

Some laptop and tablet PC (Personal Computer) devices are equipped with a connectivity card, such as a 4G ($4^{th}$ Generation mobile communication system as defined by the $3^{rd}$-Generation Partnership Project, 3GPP)/5G ($5^{th}$ Generation mobile communication system as defined by 3GPP) WWAN (Wireless Wide Area Network) modem for mobile broadband high-speed Internet access. For example, the connectivity card, such as the WWAN modem, may be designed as a detachable M.2 form factor data card, plugged into the PC platform through a M.2 connector, with data communication to the PC host software being conducted over a PCIe (Peripheral Component Interconnect express) or USB (Universal Serial Bus) bus.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
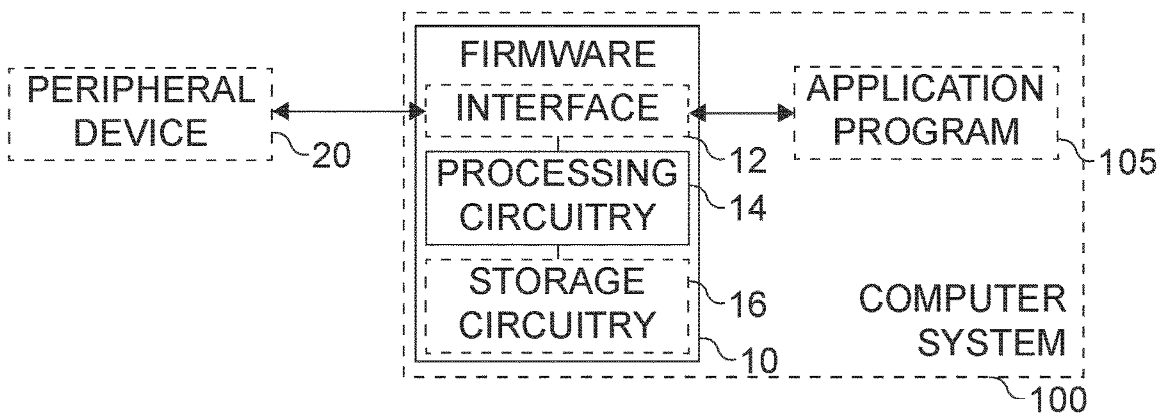
FIG. 1*a* shows a block diagram of an example of a (firmware) apparatus or device for a computer system, and of a computer system comprising such a (firmware) apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

FIG. 1*a* shows a block diagram of an example of a (firmware) apparatus 10 or (firmware) device 10 for a computer system 100, and of the computer system 10 comprising such a (firmware) apparatus 10 or device 10. The apparatus 10 comprises circuitry that is configured to provide the functionality of the apparatus 10. For example, the apparatus 10 of FIG. 1*a* comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with other components of the computer system, such as a peripheral device 20, one or more buses of the computer system, or an application program 105 being executed by (a processor of) the computer system) and the storage circuitry 16 (for storing information). Likewise, the device 10 may comprise means that is/are configured to provide the functionality of the device 10. The components of the device 10 are defined as component means, which may correspond to, or implemented by, the respective structural components of the apparatus 10. For example, the device 10 of FIGS. 1*a* and 1*b* comprises means for processing 14, which may correspond to or be implemented by the processing circuitry 14, (optional) means for communicating 12, which may correspond to or be implemented by the interface circuitry 12, and (optional) means for storing information 16, which may correspond to or be implemented by the storage circuitry 16.

The processing circuitry 14 or means for processing 14 is configured to detect the presence of a peripheral device 20 connected to the computer system 100. The processing circuitry 14 or means for processing 14 is configured to add the peripheral device to a device tree managed by a firmware of the computer system, by adding a first and a second device node to the device tree. The first device node represents the peripheral device, and the second device node represents a reset capability or firmware flash capability of the peripheral device.

In general, the apparatus 10 or device 10 introduced above may also be referred to as firmware apparatus or firmware device 10, as they provide a functionality that is part of the firmware of the computer system. Accordingly, the apparatus 10 or device 10 may be part of the firmware of the computer system. In other words, the computer system 100 may comprise a firmware, such as a BIOS (Basic Input/Output System) or UEFI (Unified Extensible Firmware Interface), which may in turn comprise the apparatus 10 or device 10. In particular, the apparatus 10 or device 10 may correspond to the firmware, or to a partial functionality of the firmware, of the computer system. For example, the apparatus 10 or device 10 may be part of the BIOS or part of the UEFI of the computer system.

Figure 1B:
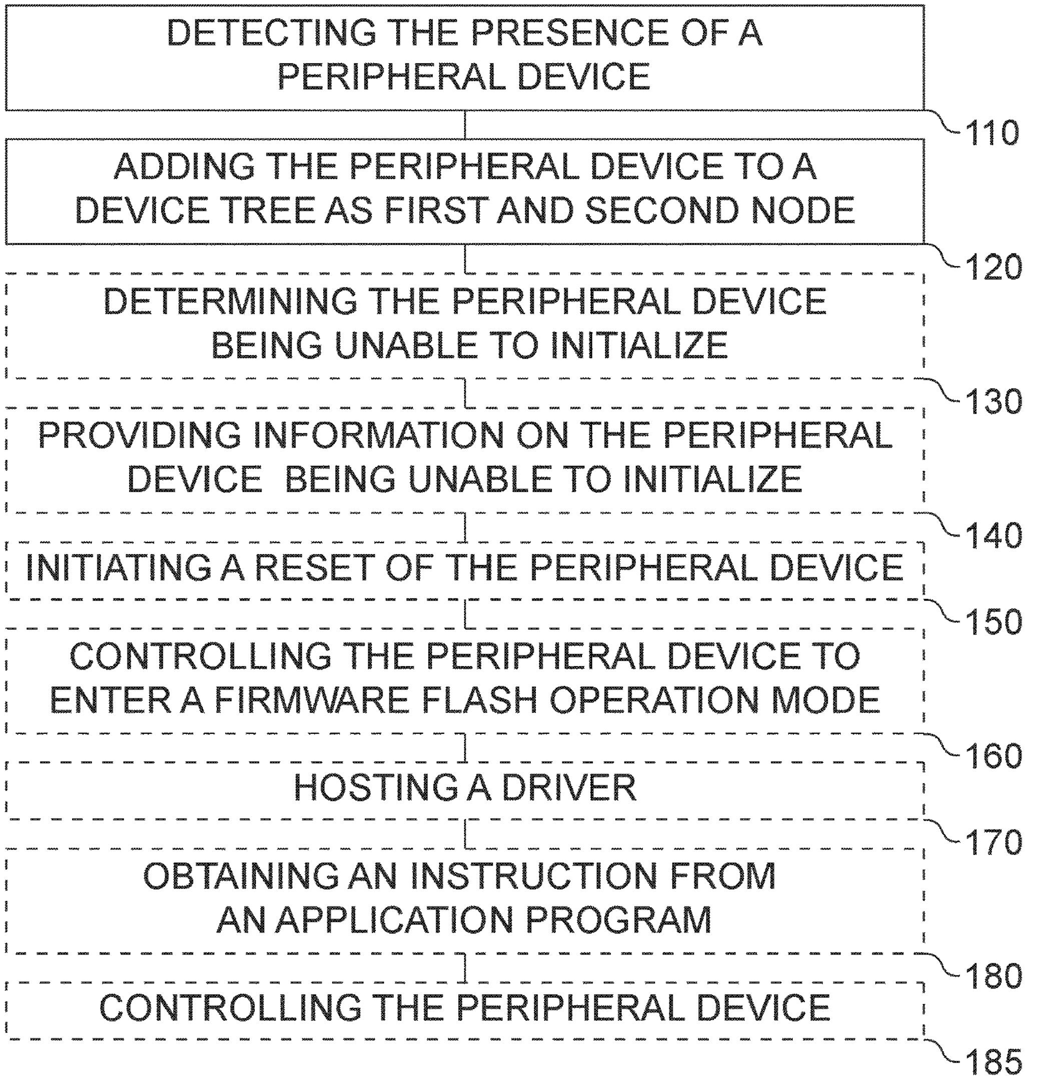
FIG. 1*b* shows a flow chart of an example of a method for a computer system.

FIG. 1*b* shows a flow chart of an example of a corresponding method for the computer system. The method comprises detecting 110 the presence of the peripheral device 20 connected to the computer system 100. The method comprises adding 120 the peripheral device to the device tree managed by a firmware of the computer system, by adding the first and the second device node to the device tree. The first device node represents the peripheral device, and the second device node represents the reset capability or firmware flash capability of the peripheral device. For example, the method may be performed by the computer system 100, e.g., by the firmware of the computer system, e.g., the apparatus or device 10.

In the following, the functionality of the computer system 100, the apparatus 10, the device 10, the method, and of a corresponding computer program is introduced with respect to the computer system 100 and apparatus 10. Features introduced in connection with the computer system 100 or apparatus 10 may likewise be included in the corresponding device 10, method and computer program.

The present disclosure relates to the management of peripheral devices, such as wireless wide area network (WWAN) cards, in computer systems, such as desktop computers, laptop computers, tablet computers, or convertibles. In particular, the present disclosure relates to a failsafe that can be used when a peripheral device becomes non-functional due to firmware corruption.

In general, most peripheral devices that are connected to a computer systems also comprise a processor or microcontroller, which is used to execute code of a firmware of the peripheral device. Once the peripheral device is connected to a computer system, e.g., via a communication bus, such as the PCI (Peripheral Component Interconnect), PCIe (PCI express), USB (Universal Serial Bus), Intel® Thunderbolt™, the microcontroller may load the device firmware to initialize the peripheral device. The device firmware is usually stored on flash storage, e.g., NAND flash (flash storage that is based on negative-AND gates). However, the device firmware stored on the flash storage may become corrupted, e.g., due to memory blocks of the flash storage failing, or as a result of a failed firmware upgrade. In this case, the firmware being loaded by the processor of microcontroller of the peripheral device may fail to initialize the peripheral device (causing a boot loop) or crash while performing some functionality. In some cases, this may lead to peripheral devices that cannot be repaired by the computer system, as a firmware flash functionality, which may be necessary for repairing the firmware of the peripheral device, is not or improperly accessible for a firmware flash driver being executed on the computer system. As a result, the peripheral device may be "bricked", i.e., be stuck without usable functionality.

To mitigate such a scenario, the proposed concept introduces an additional device node, which can be used to reset the peripheral device or to set it to a firmware flash state. This is done at startup time, i.e., when the firmware device tree is built. In some examples, the device tree may be pre-populated. In this case, this may be done at manufacturing.

The processing circuitry is configured to detect the presence of a peripheral device 20 connected to the computer system 100, e.g., during startup, or when the peripheral device 20 is connected to computer system. For example, the processing circuitry may be configured to perform device enumeration during startup of the computer system and determine the presence of the peripheral device during device enumeration. Alternatively, or additionally, the processing circuitry may be configured to manage a plug-and-play functionality of the computer system and determine the presence of the peripheral device as part of the plug-and-play functionality of the computer system.

The proposed concept is applicable to a vast array of different peripheral devices, that can be connected to the computer system via different bus systems. For example, the processing circuitry is configured to detect the presence of the peripheral device connected to the computer system via a PCI or PCIe interface, e.g., during startup of the computer system. In other words, the peripheral device may be connected to the computer system via the PCI or PCIe interface. Alternatively, or additionally, the processing circuitry may be configured to detect the presence of the peripheral device connected to the computer system via a Thunderbolt or USB interface, e.g., during startup of the computer system or upon connection of the peripheral device to the computer system. Accordingly, the peripheral device may be connected to the computer system via the USB or Thunderbolt interface.

As outlined above, the proposed concept may be used with different types of peripheral device. For example, the peripheral device may be a device that is to be used with the computer system or as a removable part of the computer system. In other words, the peripheral device may be removably attached to the computer system, e.g., to a connector of the computer system. In addition, the peripheral device may comprise a device firmware (being used for initializing and/or operating the peripheral device), which is re-programmable by flashing a flash storage of the peripheral device.

In modern computer systems, such as laptop computers, network connectivity is often implemented as peripheral device, e.g., to offer the manufacturer or customer different options when configuring the computer system. For example, in a basic configuration, a computer system may be equipped with a network connectivity peripheral device that provides basic WiFi (Wireless Fidelity) and Bluetooth connectivity. Another configuration may provide a network connectivity peripheral device that provides higher-speed WiFi connectivity (in addition to Bluetooth). In a top configuration, the network connectivity peripheral device may additionally provide cellular connectivity, or two network connectivity peripheral devices may be used (one for WiFi and Bluetooth, and the other one for cellular WWAN). Accordingly, the processing circuitry may be configured to detect the presence of a network connectivity peripheral device connected to the computer system. In particular, the processing circuitry may be configured to detect the presence of one of a wireless wide area network card, a cellular wireless wide area network card, a wireless local area network card, a Bluetooth connectivity card and a combined network connectivity card connected to the computer system. However, the concept is also applicable to other peripheral devices, such as webcams, external storage, streaming controllers, (3D) printers etc.

Figure 3A:
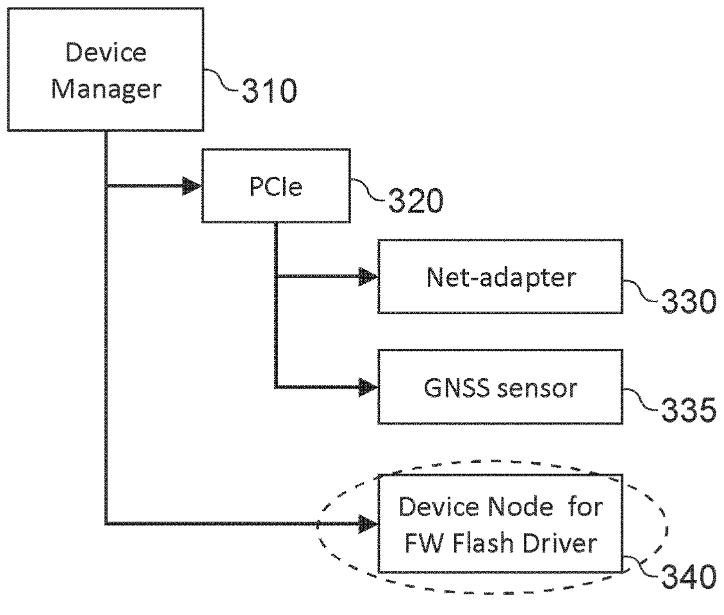
FIG. 3*a* shows a schematic diagram of a device node hierarchy according to an example.

The detected peripheral device (or peripheral devices) are then added to the device tree managed by the firmware of the computer system. In computer systems, peripherals are connected to the CPU (Central Processing Unit, e.g., the processing circuitry 14) of the computer system via a bus, such as the aforementioned PCI, PCIe, USB or Thunderbolt bus. The device tree may be considered a representation of the buses and peripherals that are connected to the CPU of the computer system. In general, in the device tree, the bus controllers, such as the PCIe root complex, may be in a first hierarchy level below the root of the device tree, and the devices connected via the respective bus, may be in a second hierarchy level below the root tree, connected to the respective bus controller. The device tree may comprise additional nodes for the CPU (in the first hierarchy level below the root) and the cores of the CPU (in the second hierarchy level below the root), and for the memory subsystem (in the first hierarchy level below the root) and the actual memory (in the second hierarchy level below the root). In general, peripherals are added to the device tree upon detection (if they are connected via a bus that supports enumeration) or as part of a pre-defined configuration (if they are not discoverable via enumeration). In various examples of the present disclosure, it is assumed that the peripheral device is connected via a bus that supports enumeration, such as PCI, PCIe, USB or Thunderbolt. Once the peripheral device is detected, it is added as first device node, as a child of the respective bus controller (or as child of a sub-category of devices, such as network controllers, as shown in FIG. 3*a*). In addition, in the proposed concept, the second device node is added. This second device node is separate from the first device node. For example, the second device node might not be added as a child of the bus controller, but separately from the bus (as shown in FIG. 3*a*). It is used as a failsafe that provides some level of access to the peripheral device when the peripheral device does not initialize properly. In particular, the second device node represents the reset capability or firmware flash capability of the peripheral device. In effect, the second device node may be used to control the peripheral device to initiate a reset or to set the peripheral device to a firmware flash state.

In general, the main functionality of the peripheral device is accessed via the first device node. For example, the main functionality of the peripheral device may be accessed via a device driver (e.g., the net adapter driver 370 shown in FIG. 3*b*), which in turn may employ a bus driver (e.g., the PCIe driver 375 shown in FIG. 3*b*), and which may use the first device node. If the peripheral device is fully functional, the same mechanism may be used for flashing the flash storage of the peripheral device. For example, as further shown in FIG. 3*b*, an application program, e.g., the firmware flash driver 350 shown in FIG. 3*b*, may access the peripheral device 380 via the bus driver 375, e.g., for card diagnosis, NAND flashing, firmware flashing. For example, the computer system (e.g., a CPU of the computer system, such as the processing circuitry 14) may be configured to execute an application program 105, such as a firmware flash driver, that is configured to interact with the apparatus 10 or device 10 with respect to the peripheral device 20. In case the peripheral device is unresponsive, another route is taken, via the second device node (BIOS device node 360 in FIG. 3*b*). In this case, the firmware flash driver may control the peripheral device via the second device node exposed by the firmware (BIOS 365 in FIG. 3*b*), to reboot the peripheral device into flashing mode. In other words, the application program may be configured to provide an instruction for the peripheral device to the apparatus 10 (or device 10), with the apparatus 10 being configured to control the peripheral device via the second device node based on the instruction. On the side of the apparatus 10, the processing circuitry (of the apparatus) may be configured to obtain the instruction for the peripheral device from the application program being executed on the computer system, and to control the peripheral device via the second device node based on the instruction. Accordingly, as further shown in FIG. 1*b*, the method may comprise obtaining 180 the instruction for the peripheral device from the application program being executed on the computer system and controlling 185 the peripheral device via the second device node based on the instruction. For example, the instruction may relate to resetting the peripheral device and/or to initiating a firmware flash operation of the peripheral device (i.e., setting the peripheral device to a firmware flash operation mode where it accepts the flash storage to be flashed with a new firmware blob). For example, the application program may be configured to re-flash the flash storage of the peripheral device once the peripheral device has entered the firmware flash operation mode.

As outlined above, the apparatus 10 (or device 10) may be part of the firmware (e.g., BIOS or UEFI) of the computer system. Accordingly, the method may be performed by the firmware of the computer systems. In computer systems, an interface called Advanced Configuration and Power Interface (ACPI) may be used by the operating system or application programs to interact with the firmware of the computer system. This interface may be used in this case as well, with the application program using the ACPI to provide the instructions to the firmware (i.e., apparatus 10). For example, the processing circuitry may be configured to obtain the instruction from the application program via ACPI.

While peripheral devices communicate with the computer systems via standardized interfaces, this mainly applies to the main functionality of the peripheral device, after the peripheral device has been initialized. In case the initialization fails, these standardized interfaces might not be available. However, low-level communication may still be possible, e.g., in order to reset the peripheral device or to set the peripheral device to a firmware flash state. The firmware (e.g., the apparatus) may comprise a driver, which can be used to access this functionality. In other words, the processing circuitry may be configured to host a driver for accessing the reset capability or firmware flash capability of the peripheral device, and to control the peripheral device based on the driver. Accordingly, as further shown in FIG. 1*b*, the method may comprise hosting 170 a driver for accessing the reset capability or firmware flash capability of the peripheral device and controlling 185 the peripheral device based on the driver.

Another functionality that can be provided by the apparatus may be to determine the state of the peripheral device. In particular, the apparatus may determine whether the peripheral device is unable to initialize itself, and thus enable normal operation (and flashing of the device firmware). In other words, the processing circuitry may be configured to determine the peripheral device being unable to initialize (i.e., to determine when or that the peripheral device cannot initialize itself). Accordingly, as further shown in FIG. 1*b*, the method may comprise determining 130 the peripheral device being unable to initialize. For example, the determination that the peripheral device is unable to initialize may be made in case communication via the first device node is unsuccessful or interrupted, or in case the peripheral device repeatedly tries to initialize itself (being caught in a boot loop). Accordingly, the processing circuitry may be configured to determine the peripheral device being unable to initialize via the first device node, e.g., by monitoring communication or responsiveness of the peripheral device via the first device node. In general, the inability to initialize may be due to a corruption of the firmware stored in the flash storage, which may be due to bad sectors or due to a failed firmware upgrade process. Accordingly, the processing circuitry may be configured to determine the peripheral device being unable to initialize due to corruption of the flash storage of the peripheral device (i.e., due to corruption of a firmware blob stored in the flash storage, e.g., due to bad sectors or a failed firmware flash operation). For example, as outlined above, the inability to initialize may manifest itself in the peripheral device being caught in a boot loop or the peripheral device freezing or restarting if a certain functionality is accessed (with the functionality depending on firmware code that is stored in a bad sector). If one of these behaviors of the peripheral device, it may be determined that the peripheral device is unable to initialize due to corruption of the flash storage of the peripheral device.

This condition (i.e., that the peripheral device is unable to initialize) may be communicated to the application program, e.g., a (firmware flash) driver of the peripheral device. For example, the processing circuitry may be configured to provide information on the peripheral device being unable to initialize to an application program being executed on the computer system. Accordingly, as further shown in FIG. 1*b*, the method may comprise providing 140 information on the peripheral device being unable to initialize to an application program being executed on the computer system. For example, the information on the peripheral device being unable to initialize may be provided as an information flag that is exposed via the ACPI. Alternatively, the application program may be invoked, e.g., via an interrupt being issued by the firmware. The application program may obtain the information on the peripheral device being unable to initialize from the firmware (e.g., by handling the interrupt or reading out the ACPI information flag). In other words, the application program may be configured to obtain information on the peripheral device being unable to initialize from the apparatus/firmware. Based on this information, e.g., upon receiving the information, the application program may provide the instruction for the peripheral device.

In some examples, the firmware may take over some functionality from the application program, e.g., to automatically bring the peripheral device to a state where the flash storage can be re-flashed with a working firmware. For example, the processing circuitry may be configured to initiate a reset of the peripheral device via the second device node upon detecting that the peripheral device is unable to initialize. Accordingly, as further shown in FIG. 1*b*, the method may comprise initiating 150 a reset of the peripheral device via the second device node upon detecting that the peripheral device is unable to initialize. Additionally, or alternatively, the processing circuitry may be configured to control the peripheral device to enter a firmware flash operation mode (i.e., a mode of operation where the peripheral device is waiting to be supplied with a new flash image to re-flash the flash storage, e.g., through the first or second device node) via the second device node upon detecting that the peripheral device is unable to initialize. Accordingly, as further shown in FIG. 1*b*, the method may comprise controlling 160 the peripheral device to enter a firmware flash operation mode via the second device node upon detecting that the peripheral device is unable to initialize. Once the peripheral device has entered the firmware flash operation mode, the application program may be notified and triggered to re-flash the flash storage of the peripheral device.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash storage, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus, device, method, computer program and computer system are mentioned in connection with the proposed concept, or one or more examples described above or below (e.g., FIG. 2*a* to 3*b*). The apparatus, device, method, computer program and computer system may comprise one or more additional optional features corresponding to one or more aspects of the proposed concept, or one or more examples described above or below.

Various examples of the present disclosure relate to a concept for firmware (e.g., BIOS) node assisted peripheral device (e.g., WWAN data card) NAND storage corruption diagnosis and firmware repair.

Some peripheral devices, such as a WWAN data card, use NAND flash storage for its firmware and NVRAM (Non-Volatile Random Access Memory) data storage. Various reasons may cause firmware or NVRAM data corruption. For example, due to aging or memory wear effects during usage, new bad blocks may appear on the NAND memory during end user usage, and the WWAN firmware flashed on these blocks may become defective and corrupted, which may lead to a malfunction of the peripheral device (e.g., data card). Firmware corruption can also be caused by a disruption during a firmware-update procedure. When a firmware-update is in progress, the PC may freeze due to other software's defects, or the user may force a PC shutdown when the battery level of the computer is low. This may cause the firmware flashing procedure to be interrupted and the data card may fail to work normally. During usage, a defective firmware may also accidently change its NVRAM data with random data, or cause a NVRAM data overflow, which may cause the firmware to run into a crash or a deadlocked state.

A software service/driver running at host side may attempt to monitor the peripheral device execution and diagnose the NAND storage corruption of the peripheral device, then try to perform the 'repair' on the fly, by erasing the entire NAND memory, marking the bad blocks, and re-flashing the data card with a WWAN firmware image copy stored at the PC side.

Reliable detection of the data-card NAND corruption and repair of its firmware, at the end-user stage, may be useful to bring the data card back to normal operation and prevent it from becoming a 'dead brick', avoiding the card from being returned to the product vendor for repair or replacement, which, otherwise, would not only increase the cost for both the end-user and the vendor, but also damage the product brand durability and reliability.

A networking peripheral device, such as a WWAN data card, may appear as a net-adapter device on the PC, with a net-adapter driver being loaded and running at the host PC side. The net-adapter driver may use a MBIM (Mobile Broadband Interface Model) software interface for data card configuration, control, and TCP/IP (Transmission Control Protocol/Internet Protocol) for sending/receiving data packets.

Figure 2A:
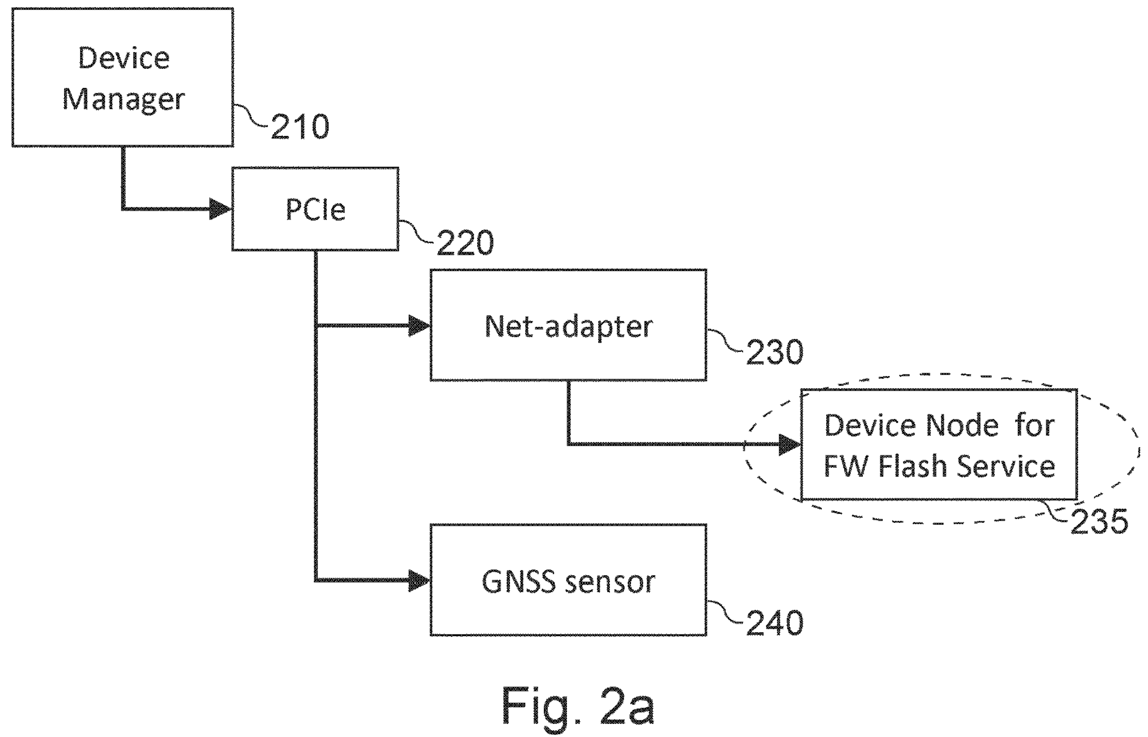
FIGS. 2*a* and 2*b* show schematic diagrams of an approach taken in some other systems.
Figure 2B:
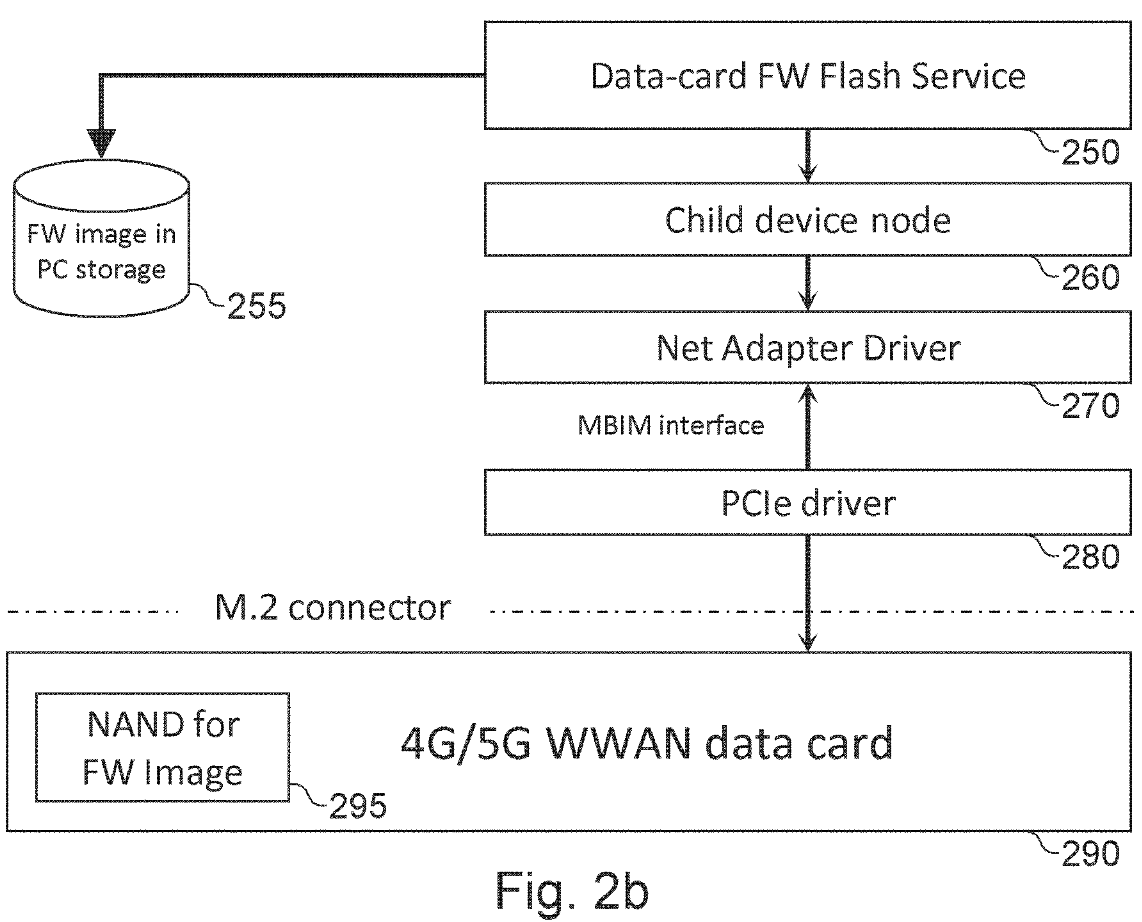

In some systems, a child device node is created under the net-adapter driver and a 'FW (firmware) Flash Service' is launched under this child node for data card diagnosis and firmware re-flashing purposes. This is illustrated in FIGS. 2*a* and 2*b*. In FIG. 2*a*, the device node hierarchy is shown, and in FIG. 2*b*, the corresponding software hierarchy for the NAND device repair is shown. FIGS. 2*a* and 2*b* show schematic diagrams of an approach taken in some other systems. FIG. 2*a* shows a schematic diagram of a device node hierarchy. The device node hierarchy starts with a device manager 210, which is at the highest hierarchy level shown. A hierarchy level below the device manager 210, the PCIe bus node 220 is shown. A hierarchy level below the PCIe bus node 220, two nodes are shown coupled to the PCIe bus—a net-adapter node 230 and a GNSS (Global Navigation Satellite System) node 240. A hierarchy level below the net-adapter node 230 and coupled to it, a device node for firmware flash service 235 is shown. FIG. 2*b* shows a schematic diagram of a data-card NAND repair SW hierarchy. In FIG. 2*b*, a data-card firmware flash service 250 accesses a firmware image in PC storage 255 and accesses the 4G/5G WWAN data card 290 via a child device node 260, a net adapter driver 270 and a PCIe driver 280 (with the connection between the net adapter driver being based on the MBIM interface). In FIG. 2*b*, the WWAN data card is connected to the PCIe bus via a M.2 connector. The WWAN data cared comprises the NAND for the firmware image 295 that is being repaired by the data-card firmware flash service 250.

When concluding that the data card NAND 295 is corrupted, the firmware flash service 250 may initiate a firmware re-flashing procedure. It may use the aforementioned MBIM interface (as exposed by net-adapter driver) to request a data card reboot into its flashing mode, then to erase its entire NAND 295 memory, marking the bad blocks, and re-flash the data-card firmware with a copy 255 stored at the PC host side.

However, the child device node and the firmware flash service may have a dependency to the underlying net-adapter driver and its software interface towards the WWAN data-card. In some cases, when the net-adapter driver fails to work properly due to WWAN data card malfunction, it may also fail to detect the data card NAND memory corruption status or fail to re-flash the firmware. Two exemplary cases are given below.

For example, in a first case, a data-card model is equipped to perform a NAND partition integrity check (e.g., a CRC (Cyclic Redundancy Check) checking or similar) at its early boot-rom code stage. When the integrity check fails, the boot-rom code may stay in an endless loop instead of executing the firmware stored on the NAND memory. In this case, the net-adapter driver might not establish the MBIM command communication with the data card, and it may consequently either fail to create the child device node and load the firmware flash service or the firmware flash service may fail to repair the data card due to unavailable MBIM command communication. Some net-adapter drivers may attempt to initiate a driver unload-and-reload procedure as mitigation, but the corruption may appear as repeated but unsuccessful data card reboots, so that a driver reload might not be able to mitigate the problem.

In a second case, a data card model might not support NAND partition integrity check at its boot-up stage. In this case, the corrupted firmware may be blindly loaded into DDR (Double Data Rate) memory for execution. When the firmware runs to the corrupted point, it may cause assertion and reset, or it may be stuck at the defective point and freeze. When this occurs before the data-card firmware has established its software interface with the host net-adapter driver, or when the defective point itself is in the firmware code responsible for host interfacing, it may cause the host side net-adapter driver failure as well. Consequently, the data-card firmware flash service might either not be loaded or fail to perform the repair procedure.

In both cases shown above, the firmware flash service may fail to repair the corrupted NAND firmware, and the data card may become a 'dead brick' with a premature end of the lifetime.

Various examples of the present disclosure may address the aforementioned drawbacks, so that data card NAND corruption may be detected, and the firmware may be re-flashed in different cases.

In various examples of the present disclosure, instead of (or in addition to) creating a child device node under the net-adapter driver, the firmware (e.g., BIOS or UEFI) is used to expose a permanent device node (e.g., the second device node) for the WWAN data card, which is created once the presence of the WWAN data card is detected. It may be kept present regardless the data card execution state, whether it can boot-up successfully or not, or whether it works normally or not. This is illustrated in FIG. 3*a*. FIG. 3*a* shows a schematic diagram of a device node hierarchy according to an example. Similar to FIG. 2*a*, the device node hierarchy starts with a device manager 210, which is at the highest hierarchy level shown. A hierarchy level below the device manager 310, the PCIe bus node 320 is shown. A hierarchy level below the PCIe bus node 320, two nodes are shown coupled to the PCIe bus—a net-adapter node 330 and a GNSS (Global Navigation Satellite System) node 335. On the same hierarchy level as the PCIe bus node, and in contrast to the example shown in FIG. 2*a*, a device node 340 for the firmware flash driver is shown. For example, the BIOS device node may expose the ACPI interface for data card power on/off and reset control, e.g., with a WWAN data-card-specific command pattern to instruct it to boot into flashing mode.

Figure 3B:
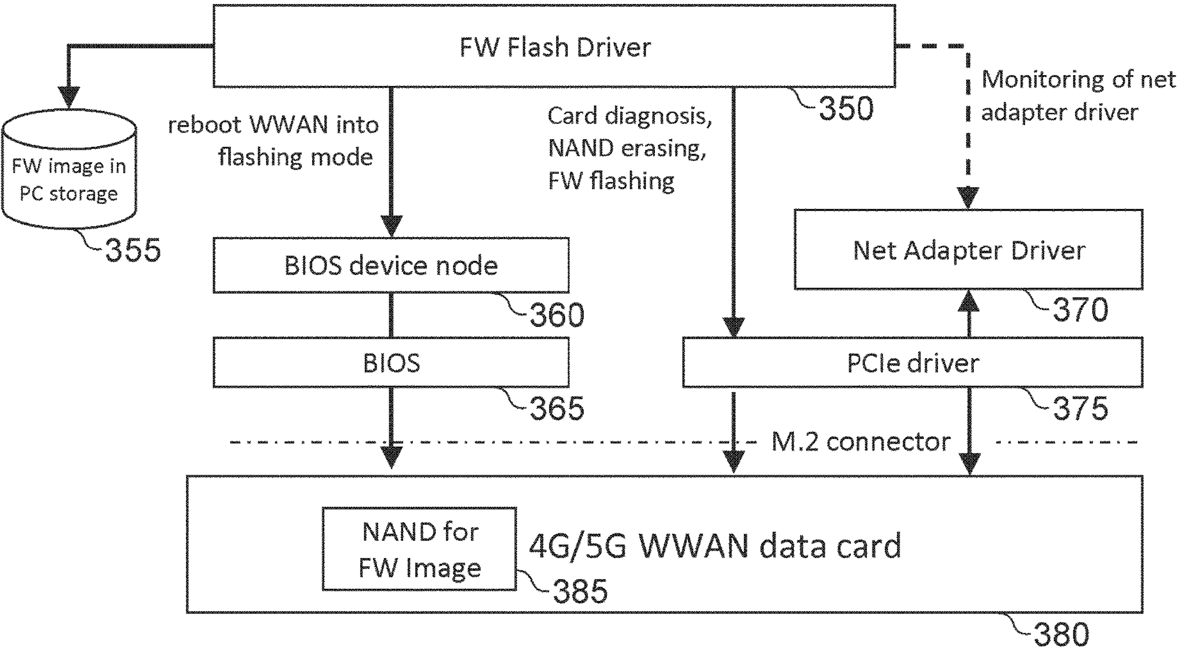
FIG. 3*b* shows a schematic diagram of a NAND repair software hierarchy according to an example.

FIG. 3*b* shows a schematic diagram of a NAND repair software hierarchy according to an example. In FIG. 3*b*, similar to FIG. 2*b*, a firmware flash driver 350 accesses a firmware image in PC storage 355 and accesses the 4G/5G WWAN data card 390 via different ways—to reboot the WWAN card in to flashing mode, the firmware flash driver 350 may access the WWAN data card 380 via the BIOS device node 360 (e.g., node 340 shown in FIG. 3*a*) and the BIOS 365, and for card diagnosis, NAND erasing and firmware flashing (of the NAND 385), the firmware flash driver 350 may access the WWAN data card 380 via the PCIe driver 375. The firmware flash driver 350 may further monitor the net adapter driver 370, which is also connected to the WWAN data card 380 via the PCIe driver 375. Similar to FIG. 2*b*, the WWAN data card may be connected to the computer system via a M.2 connector.

As shown in FIG. 3*b*, the firmware flash driver may be attached to the BIOS device node (340 in FIG. 3*a*, 360 in FIG. 3*b*), loaded after the device code is created, regardless of the net-adapter driver execution status. Independent of the net-adapter driver or its software interface, it may be kept running to monitor the data card execution status and diagnose the data card NAND corruption situation. When NAND corruption concluded, the firmware flash driver may use the BIOS node's ACPI interface to reboot the data card into flashing mode and start the NAND erasing and firmware flashing procedure. Optionally it may also monitor net-adapter driver execution and attempt to recover net-adapter related software out-of-function. This is illustrated in FIG. 3*b*.

The proposed concept may feature a permanent BIOS device node, an ACPI interface for rebooting the data card into flashing mode and an (always-running) data-card firmware flash driver on the node, being independent of the WWAN data card's net-adapter driver, its child device node, or its software interface towards the data card. For example, the proposed concept may provide a detection of data-card NAND corruption with increased reliability and a bigger likelihood for successful repair of its firmware, under various data-card or net-adapter driver erroneous conditions. For example, it may be used to repair the firmware, in cases the net-adapter driver fails to be loaded, the net-adapter fails to create a child device node, a firmware flash service that uses a net-adapter driver fails to be launched, and/or the net-adapter fails to establish software communication with the data card. For example, it may be used to repair the firmware, in cases the data card supports NAND partition checking at its boot-up stage, and/or the data card doesn't support NAND partition checking at its boot-up stage. For example, it may be used to repair the firmware, in case the data-card firmware failure point may or may not affect its MBIM communication with host.

The proposed concept may thus avoid cases in which the data card is bricked, relieving the end-user from returning the card to the product vendor for repair/replacement, which may save costs for both the end-user and the vendor, improving durability and reliability.

The proposed concept may be motivated by issue-reports on firmware repair failures, observed at the end-user side and at the manufacturing line. The proposed concept has been implemented as host driver & firmware (e.g., BIOS) enhancement and has been evaluated, confirming that the reported issues are well addressed with the proposed enhancement. Tests have been performed, showing that the proposed concept may work reliably to successfully reflash and recover a WWAN data card with corrupted firmware or NAND NVRAM content. For tests, different approaches to simulate the firmware/NAND corruption issue were used, to verify that the proposed can deal with the error/failure correctly. Such approaches include, e.g., removing the battery when firmware flashing is ongoing, removing the data-card when firmware flashing is ongoing, forcing a PC shutdown when firmware flashing is ongoing, killing the flashing tool when firmware flashing is ongoing, suspending the host driver when firmware flashing is ongoing, flashing an incorrect version of firmware to the card, using a debug tool to modify NVRAM content with garbage/invalid data etc. These approaches would cause firmware/NVRAM corruption with either boot-up failure or run-time crashes. It was verified that the proposed concept may be used to successfully perform a re-flashing & recovery procedure and bring it back to normal function.

While examples are given with respect to a WWAN data card, the features described in connection with the WWAN data card may likewise be implemented with respect to any peripheral device as described in connection with FIGS. 1*a* to 1*b*.

More details and aspects of the concept for firmware node assisted peripheral device NAND storage corruption diagnosis and firmware repair are mentioned in connection with the proposed concept or one or more examples described above or below (e.g., FIG. 1*a* to 1*b*). The concept for firmware node assisted peripheral device NAND storage corruption diagnosis and firmware repair may comprise one or more additional optional features corresponding to one or more aspects of the proposed concept, or one or more examples described above or below.

In the following, some examples are presented:

An example (e.g., example 1) relates to an apparatus (10) for a computer system (100), the apparatus comprising processing circuitry (14) configured to detect the presence of a peripheral device (20) connected to the computer system (100). The processing circuitry is configured to add the peripheral device to a device tree managed by a firmware of the computer system, by adding a first and a second device node to the device tree, the first device node representing the peripheral device and the second device node representing a reset capability or firmware flash capability of the peripheral device.

Another example (e.g., example 2) relates to a previously described example (e.g., example 1) or to any of the examples described herein, further comprising that the processing circuitry is configured to detect the presence of a network connectivity peripheral device connected to the computer system.

Another example (e.g., example 3) relates to a previously described example (e.g., example 2) or to any of the examples described herein, further comprising that the processing circuitry is configured to detect the presence of one of a wireless wide area network card, a cellular wireless wide area network card, a wireless local area network card, a Bluetooth connectivity card and a combined network connectivity card connected to the computer system.

Another example (e.g., example 4) relates to a previously described example (e.g., one of the examples 1 to 3) or to any of the examples described herein, further comprising that the processing circuitry is configured to detect the presence of the peripheral device connected to the computer system via a Peripheral Component Interconnect express interface.a Another example (e.g., example 5) relates to a previously described example (e.g., one of the examples 1 to 3) or to any of the examples described herein, further comprising that the processing circuitry is configured to detect the presence of the peripheral device connected to the computer system via a Thunderbolt or Universal Serial Bus interface.

Another example (e.g., example 6) relates to a previously described example (e.g., one of the examples 1 to 5) or to any of the examples described herein, further comprising that the processing circuitry is configured to determine the peripheral device being unable to initialize.

Another example (e.g., example 7) relates to a previously described example (e.g., example 6) or to any of the examples described herein, further comprising that the processing circuitry is configured to determine the peripheral device being unable to initialize due to corruption of a flash storage of the peripheral device.

Another example (e.g., example 8) relates to a previously described example (e.g., one of the examples 6 to 7) or to any of the examples described herein, further comprising that the processing circuitry is configured to provide information on the peripheral device being unable to initialize to an application program being executed on the computer system.

Another example (e.g., example 9) relates to a previously described example (e.g., one of the examples 6 to 8) or to any of the examples described herein, further comprising that the processing circuitry is configured to determine the peripheral device being unable to initialize via the first device node.

Another example (e.g., example 10) relates to a previously described example (e.g., one of the examples 6 to 9) or to any of the examples described herein, further comprising that the processing circuitry is configured to initiate a reset of the peripheral device via the second device node upon detecting that the peripheral device is unable to initialize.

Another example (e.g., example 11) relates to a previously described example (e.g., one of the examples 6 to 10) or to any of the examples described herein, further comprising that the processing circuitry is configured to control the peripheral device to enter a firmware flash operation mode via the second device node upon detecting that the peripheral device is unable to initialize.

Another example (e.g., example 12) relates to a previously described example (e.g., one of the examples 1 to 11) or to any of the examples described herein, further comprising that the processing circuitry is configured to obtain an instruction for the peripheral device from an application program being executed on the computer system, and to control the peripheral device via the second device node based on the instruction.

Another example (e.g., example 13) relates to a previously described example (e.g., example 12) or to any of the examples described herein, further comprising that the instruction relates to resetting the peripheral device.

Another example (e.g., example 14) relates to a previously described example (e.g., example 12) or to any of the examples described herein, further comprising that the instruction relates to initiating a firmware flash operation of the peripheral device.

Another example (e.g., example 15) relates to a previously described example (e.g., one of the examples 12 to 14) or to any of the examples described herein, further comprising that the processing circuitry is configured to host a driver for accessing the reset capability or firmware flash capability of the peripheral device, and to control the peripheral device based on the driver.

Another example (e.g., example 16) relates to a previously described example (e.g., one of the examples 12 to 15) or to any of the examples described herein, further comprising that the processing circuitry is configured to obtain the instruction from the application program via an Advanced Configuration and Power Interface.

Another example (e.g., example 17) relates to a previously described example (e.g., one of the examples 1 to 16) or to any of the examples described herein, further comprising that the second device node is separate from the first device node.

Another example (e.g., example 18) relates to a previously described example (e.g., one of the examples 1 to 17) or to any of the examples described herein, further comprising that the apparatus is part of the firmware of the computer system.

An example (e.g., example 19) relates to a computer system (100) comprising the apparatus (10) according to one of the examples 1 to 18 or according to any other example, wherein the apparatus is part of a firmware of the computer system.

Another example (e.g., example 20) relates to a previously described example (e.g., example 19) or to any of the examples described herein, further comprising that the apparatus is part of a Basic Input Output System, BIOS, or part of a Unified Extensible Firmware Interface, UEFI, of the computer system.

Another example (e.g., example 21) relates to a previously described example (e.g., one of the examples 19 to 20) or to any of the examples described herein, further comprising that the computer system is configured to execute an application program (105) that is configured to interact with the apparatus with respect to the peripheral device (20).

Another example (e.g., example 22) relates to a previously described example (e.g., example 21) or to any of the examples described herein, further comprising that the application program is configured to provide an instruction for the peripheral device to the apparatus, with the apparatus being configured to control the peripheral device via the second device node based on the instruction.

Another example (e.g., example 23) relates to a previously described example (e.g., one of the examples 21 to 22) or to any of the examples described herein, further comprising that the application program is configured to obtain information on the peripheral device being unable to initialize from the apparatus.

An example (e.g., example 24) relates to a device (10) for a computer system (100), the device comprising means for processing (14) configured to detect the presence of a peripheral device (20) connected to the computer system (100). The means for processing is configured to add the peripheral device to a device tree managed by a firmware of the computer system, by adding a first and a second device node to the device tree, the first device node representing the peripheral device and the second device node representing a reset capability or firmware flash capability of the peripheral device.

Another example (e.g., example 25) relates to a previously described example (e.g., example 24) or to any of the examples described herein, further comprising that the means for processing is configured to detect the presence of a network connectivity peripheral device connected to the computer system.

Another example (e.g., example 26) relates to a previously described example (e.g., example 25) or to any of the examples described herein, further comprising that the means for processing is configured to detect the presence of one of a wireless wide area network card, a cellular wireless wide area network card, a wireless local area network card, a Bluetooth connectivity card and a combined network connectivity card connected to the computer system.

Another example (e.g., example 27) relates to a previously described example (e.g., one of the examples 24 to 26) or to any of the examples described herein, further comprising that the means for processing is configured to detect the presence of the peripheral device connected to the computer system via a Peripheral Component Interconnect express interface.

Another example (e.g., example 28) relates to a previously described example (e.g., one of the examples 24 to 27) or to any of the examples described herein, further comprising that the means for processing is configured to detect the presence of the peripheral device connected to the computer system via a Thunderbolt or Universal Serial Bus interface.

Another example (e.g., example 29) relates to a previously described example (e.g., one of the examples 24 to 28) or to any of the examples described herein, further comprising that the means for processing is configured to determine the peripheral device being unable to initialize.

Another example (e.g., example 30) relates to a previously described example (e.g., example 29) or to any of the examples described herein, further comprising that the means for processing is configured to determine the peripheral device being unable to initialize due to corruption of a flash storage of the peripheral device.

Another example (e.g., example 31) relates to a previously described example (e.g., one of the examples 29 to 30) or to any of the examples described herein, further comprising that the means for processing is configured to provide information on the peripheral device being unable to initialize to an application program being executed on the computer system.

Another example (e.g., example 32) relates to a previously described example (e.g., one of the examples 29 to 31) or to any of the examples described herein, further comprising that the means for processing is configured to determine the peripheral device being unable to initialize via the first device node.

Another example (e.g., example 33) relates to a previously described example (e.g., one of the examples 29 to 32) or to any of the examples described herein, further comprising that the means for processing is configured to initiate a reset of the peripheral device via the second device node upon detecting that the peripheral device is unable to initialize.

Another example (e.g., example 34) relates to a previously described example (e.g., one of the examples 29 to 33) or to any of the examples described herein, further comprising that the means for processing is configured to control the peripheral device to enter a firmware flash operation mode via the second device node upon detecting that the peripheral device is unable to initialize.

Another example (e.g., example 35) relates to a previously described example (e.g., one of the examples 24 to 34) or to any of the examples described herein, further comprising that the means for processing is configured to obtain an instruction for the peripheral device from an application program being executed on the computer system, and to control the peripheral device via the second device node based on the instruction.

Another example (e.g., example 36) relates to a previously described example (e.g., example 35) or to any of the examples described herein, further comprising that the instruction relates to resetting the peripheral device.

Another example (e.g., example 37) relates to a previously described example (e.g., example 35) or to any of the examples described herein, further comprising that the instruction relates to initiating a firmware flash operation of the peripheral device.

Another example (e.g., example 38) relates to a previously described example (e.g., one of the examples 35 to 37) or to any of the examples described herein, further comprising that the means for processing is configured to host a driver for accessing the reset capability or firmware flash capability of the peripheral device, and to control the peripheral device based on the driver.

Another example (e.g., example 39) relates to a previously described example (e.g., one of the examples 35 to 38) or to any of the examples described herein, further comprising that the means for processing is configured to obtain the instruction from the application program via an Advanced Configuration and Power Interface.

Another example (e.g., example 40) relates to a previously described example (e.g., one of the examples 24 to 39) or to any of the examples described herein, further comprising that the second device node is separate from the first device node.

Another example (e.g., example 41) relates to a previously described example (e.g., one of the examples 24 to 40) or to any of the examples described herein, further comprising that the device is part of the firmware of the computer system.

An example (e.g., example 42) relates to a computer system (100) comprising the device (10) according to one of the examples 24 to 41 or according to any other example, wherein the device is part of a firmware of the computer system.

Another example (e.g., example 43) relates to a previously described example (e.g., example 42) or to any of the examples described herein, further comprising that the device is part of a Basic Input Output System, BIOS, or part of a Unified Extensible Firmware Interface, UEFI, of the computer system.

Another example (e.g., example 44) relates to a previously described example (e.g., one of the examples 42 to 43) or to any of the examples described herein, further comprising that the computer system is configured to execute an application program (105) that is configured to interact with the device with respect to the peripheral device (20).

Another example (e.g., example 45) relates to a previously described example (e.g., example 44) or to any of the examples described herein, further comprising that the application program is configured to provide an instruction for the peripheral device to the device, with the device being configured to control the peripheral device via the second device node based on the instruction.

Another example (e.g., example 46) relates to a previously described example (e.g., one of the examples 44 to 45) or to any of the examples described herein, further comprising that the application program is configured to obtain information on the peripheral device being unable to initialize from the device.

An example (e.g., example 47) relates to a method for a computer system (100), the method comprising detecting (110) the presence of a peripheral device (20) connected to the computer system (100). The method comprises adding (120) the peripheral device to a device tree managed by a firmware of the computer system, by adding a first and a second device node to the device tree, the first device node representing the peripheral device and the second device node representing a reset capability or firmware flash capability of the peripheral device.

Another example (e.g., example 48) relates to a previously described example (e.g., example 47) or to any of the examples described herein, further comprising that the method comprises detecting (110) the presence of a network connectivity peripheral device connected to the computer system.

Another example (e.g., example 49) relates to a previously described example (e.g., example 48) or to any of the examples described herein, further comprising that the method comprises detecting (110) the presence of one of a wireless wide area network card, a cellular wireless wide area network card, a wireless local area network card, a Bluetooth connectivity card and a combined network connectivity card connected to the computer system.

Another example (e.g., example 50) relates to a previously described example (e.g., one of the examples 47 to 49) or to any of the examples described herein, further comprising that the method comprises detecting (110) the presence of the peripheral device connected to the computer system via a Peripheral Component Interconnect express interface.

Another example (e.g., example 51) relates to a previously described example (e.g., one of the examples 47 to 50) or to any of the examples described herein, further comprising that the method comprises detecting (110) the presence of the peripheral device connected to the computer system via a Thunderbolt or Universal Serial Bus interface.

Another example (e.g., example 52) relates to a previously described example (e.g., one of the examples 47 to 51) or to any of the examples described herein, further comprising that the method comprises determining (130) the peripheral device being unable to initialize.

Another example (e.g., example 53) relates to a previously described example (e.g., example 52) or to any of the examples described herein, further comprising that the method comprises determining (130) the peripheral device being unable to initialize due to corruption of a flash storage of the peripheral device.

Another example (e.g., example 54) relates to a previously described example (e.g., one of the examples 52 to 53) or to any of the examples described herein, further comprising that the method comprises providing (140) information on the peripheral device being unable to initialize to an application program being executed on the computer system.

Another example (e.g., example 55) relates to a previously described example (e.g., one of the examples 52 to 54) or to any of the examples described herein, further comprising that the method comprises determining (130) the peripheral device being unable to initialize via the first device node.

Another example (e.g., example 56) relates to a previously described example (e.g., one of the examples 52 to 55) or to any of the examples described herein, further comprising that the method comprises initiating (150) a reset of the peripheral device via the second device node upon detecting that the peripheral device is unable to initialize.

Another example (e.g., example 57) relates to a previously described example (e.g., one of the examples 52 to 56) or to any of the examples described herein, further comprising that the method comprises controlling (160) the peripheral device to enter a firmware flash operation mode via the second device node upon detecting that the peripheral device is unable to initialize.

Another example (e.g., example 58) relates to a previously described example (e.g., one of the examples 47 to 57) or to any of the examples described herein, further comprising that the method comprises obtaining (180) an instruction for the peripheral device from an application program being executed on the computer system and controlling (185) the peripheral device via the second device node based on the instruction.

Another example (e.g., example 59) relates to a previously described example (e.g., example 58) or to any of the examples described herein, further comprising that the instruction relates to resetting the peripheral device.

Another example (e.g., example 60) relates to a previously described example (e.g., example 58) or to any of the examples described herein, further comprising that the instruction relates to initiating a firmware flash operation of the peripheral device.

Another example (e.g., example 61) relates to a previously described example (e.g., one of the examples 58 to 60) or to any of the examples described herein, further comprising that the method comprises hosting (170) a driver for accessing the reset capability or firmware flash capability of the peripheral device and controlling (185) the peripheral device based on the driver.

Another example (e.g., example 62) relates to a previously described example (e.g., one of the examples 58 to 61) or to any of the examples described herein, further comprising that the instruction is obtained from the application program via an Advanced Configuration and Power Interface.

Another example (e.g., example 63) relates to a previously described example (e.g., one of the examples 47 to 62) or to any of the examples described herein, further comprising that the second device node is separate from the first device node.

Another example (e.g., example 64) relates to a previously described example (e.g., one of the examples 47 to 63) or to any of the examples described herein, further comprising that the method is performed by the firmware of the computer system.

An example (e.g., example 65) relates to a computer system (100) comprising a firmware (10), configured to perform the method according to one of the examples 47 to 64 or according to any other example.

Another example (e.g., example 66) relates to a previously described example (e.g., example 65) or to any of the examples described herein, further comprising that the firmware is a Basic Input Output System, BIOS, or a Unified Extensible Firmware Interface, UEFI, of the computer system.

Another example (e.g., example 67) relates to a previously described example (e.g., one of the examples 65 to 66) or to any of the examples described herein, further comprising that the computer system is configured to execute an application program (105) that is configured to interact with the firmware with respect to the peripheral device (20).

Another example (e.g., example 68) relates to a previously described example (e.g., example 67) or to any of the examples described herein, further comprising that the application program is configured to provide an instruction for the peripheral device to the method, with the firmware being configured to control the peripheral device via the second device node based on the instruction.

Another example (e.g., example 69) relates to a previously described example (e.g., one of the examples 67 to 68) or to any of the examples described herein, further comprising that the application program is configured to obtain information on the peripheral device being unable to initialize from the firmware.

An example (e.g., example 70) relates to a non-transitory machine-readable storage medium including program code, when executed, to cause a machine to perform the method of one of the examples 47 to 64 or according to any other example.

An example (e.g., example 71) relates to a computer program having a program code for performing the method of one of the examples 47 to 64 or according to any other example when the computer program is executed on a computer, a processor, or a programmable hardware component.

An example (e.g., example 72) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for a computer system, the apparatus comprising processing circuitry configured to:

detect the presence of a peripheral device connected to the computer system;

add the peripheral device to a device tree managed by a firmware of the computer system, by adding a first and a second device node to the device tree, the first device node representing the peripheral device and the second device node representing a reset capability or firmware flash capability of the peripheral device.

2. The apparatus according to claim 1, wherein the processing circuitry is configured to detect the presence of a network connectivity peripheral device connected to the computer system.

3. The apparatus according to claim 2, wherein the processing circuitry is configured to detect the presence of one of a wireless wide area network card, a cellular wireless wide area network card, a wireless local area network card, a Bluetooth connectivity card and a combined network connectivity card connected to the computer system.

4. The apparatus according to claim 1, wherein the processing circuitry is configured to detect the presence of the peripheral device connected to the computer system via a Peripheral Component Interconnect express interface.

5. The apparatus according to claim 1, wherein the processing circuitry is configured to detect the presence of the peripheral device connected to the computer system via a Thunderbolt or Universal Serial Bus interface.

6. The apparatus according to claim 1, wherein the processing circuitry is configured to determine the peripheral device being unable to initialize.

7. The apparatus according to claim 6, wherein the processing circuitry is configured to determine the peripheral device being unable to initialize due to corruption of a flash storage of the peripheral device.

8. The apparatus according to claim 6, wherein the processing circuitry is configured to provide information on the peripheral device being unable to initialize to an application program being executed on the computer system.

9. The apparatus according to claim 6, wherein the processing circuitry is configured to determine the peripheral device being unable to initialize via the first device node.

10. The apparatus according to claim 6, wherein the processing circuitry is configured to initiate a reset of the peripheral device via the second device node upon detecting that the peripheral device is unable to initialize.

11. The apparatus according to claim 6, wherein the processing circuitry is configured to control the peripheral device to enter a firmware flash operation mode via the second device node upon detecting that the peripheral device is unable to initialize.

12. The apparatus according to claim 1, wherein the processing circuitry is configured to obtain an instruction for the peripheral device from an application program being executed on the computer system, and to control the peripheral device via the second device node based on the instruction.

13. The apparatus according to claim 12, wherein the instruction relates to resetting the peripheral device.

14. The apparatus according to claim 12, wherein the instruction relates to initiating a firmware flash operation of the peripheral device.

15. The apparatus according to claim 12, wherein the processing circuitry is configured to host a driver for accessing the reset capability or firmware flash capability of the peripheral device, and to control the peripheral device based on the driver.

16. The apparatus according to claim 12, wherein the processing circuitry is configured to obtain the instruction from the application program via an Advanced Configuration and Power Interface.

17. A computer system comprising the apparatus according to claim 1, wherein the apparatus is part of a firmware of the computer system.

18. The computer system according to claim 17, wherein the apparatus is part of a Basic Input Output System, BIOS, or part of a Unified Extensible Firmware Interface, UEFI, of the computer system.

19. A method for a computer system, the method comprising:

detecting the presence of a peripheral device connected to the computer system;

adding the peripheral device to a device tree managed by a firmware of the computer system, by adding a first and a second device node to the device tree, the first device node representing the peripheral device and the second device node representing a reset capability or firmware flash capability of the peripheral device.

20. A non-transitory machine-readable storage medium including a program code for performing the method of claim 19 when the program code is executed on a computer, a processor, or a programmable hardware component.

* * * * *